W. C. McCOOL.
Improvement in Sulky-Plows.

No. 126,976. Patented May 21, 1872.

Witnesses:
Chas. Nida
Geo. W. Mabee

Inventor:
W. C. McCool
per Munn & Co.
Attorneys.

UNITED STATES PATENT OFFICE.

WELLS C. McCOOL, OF GUTHRIE CENTRE, IOWA.

IMPROVEMENT IN WHEEL-PLOWS.

Specification forming part of Letters Patent No. 126,976, dated May 21, 1872.

Specification describing a new and useful Improvement in Sulky-Plow, invented by WELLS C. McCOOL, of Guthrie Centre, in the county of Guthrie and State of Iowa.

Figure 1:
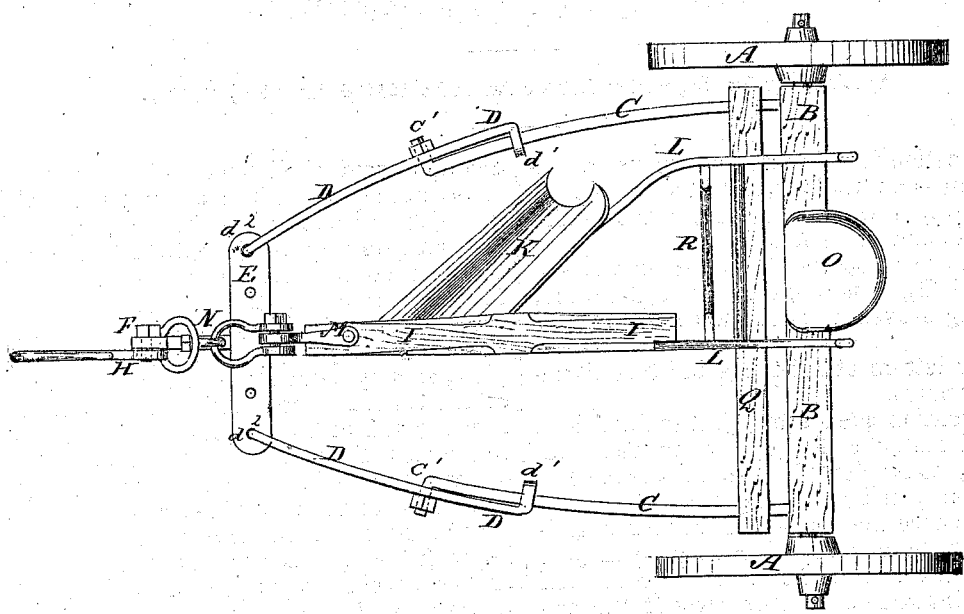
Figure 2:
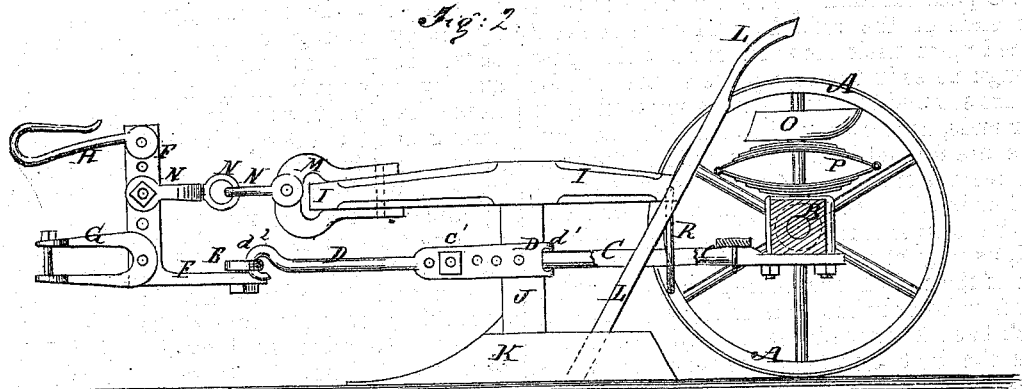

Figure 1 is a top view of my improved sulky-plow. Fig. 2 is a side view of the same, part being broken away to show the construction.

Similar letters of reference indicate corresponding parts.

My invention has for its object to furnish an improved sulky or riding plow, simple in construction, convenient in use, inexpensive in manufacture, and which may be readily adjusted to cause the plow to run deeper or shallower, or to take more or less land, as may be desired; and it consists in the construction and combination of various parts of the machine, as hereinafter more fully described.

A are the wheels, which revolve upon the journals of the axle B, to which, near its ends, are attached the rear ends of the rods C. The rods C pass through eyes $d'$ formed upon the rear ends of the rods D, and have hooks $c'$ formed upon their forward ends, which pass through holes in the rear parts of the rods D, and are secured in place by nuts screwed upon their ends, as shown in Figs. 1 and 2. Several holes are formed in the rear ends of the rods D to receive the hooks $c'$ formed upon the forward ends of the rods C, so that the rods C D may be conveniently lengthened and shortened, as may be required. Upon the forward ends of the rods D are formed hooks $d^2$, which hook into holes in the ends of the cross-bar E, which has numerous holes formed in it to receive the bolt by which the rear end of the draft-bar or equalizer F is connected with said cross-bar, so that the said bolt may be conveniently shifted to cause the sulky to run more to the right or left, as may be desired. The equalizer F is bent at right angles, and in its free or upright arm are formed several holes to receive the bolts by which the clevis G and hook H, either or both, are secured to the said arm for the attachment of the draft, so that the draft may be regulated at will. The clevis G and draft-hook H are bolted to the side of the upright arm of the equalizer F, so that by changing said clevis and hook from one side of said equalizer to the other the draft may be adjusted to cause the plow to take more or less land, as may be desired. I is the beam, J the standard, K the plow-plate, and L the handles of an ordinary plow, about the construction of which there is nothing new, and which may be a right-hand or left-hand plow, as may be desired. To the forward end of the beam I is attached a clevis, M, which is connected with the equalizer F by a swivel connection, N, so that the plow may be drawn directly from said equalizer, and entirely independent of the sulky, and so that the plow may be turned about freely without interfering with the equalizer or sulky. O is the driver's seat, which rests upon springs P attached to the axle B. To the rear parts of the rods C is attached a board, Q, for the driver to rest his feet upon when desired. To the plow-handles L is attached a rest, R, to receive the driver's feet when required to assist in steadying the plow. By this arrangement the driver, by simply moving forward upon his seat, can cause the plow to run deeper in the ground, and by moving back upon his seat he can cause the plow to run out of the ground. The arrangement of the equalizer F, clevis G, and hook H herein described is designed for drawing a plow; for drawing a drag or harrow the equalizer F may be inverted, and the same hook and clevis used; but in this case I prefer to make the hook H and clevis G with a slot in their base to receive the equalizer F, as making the draft more central.

Having thus described my invention, I claim as new and desire to secure by Letters Patent—

The equalizer F, provided with a clevis, G, and hook H, either or both, and a swivel, N, to adapt it for attachment to a sulky, A B C D E, and plow I U K L, substantially as herein shown and described, and for the purpose set forth.

WELLS C. McCOOL.

Witnesses:
A J. McMILLAN,
JOHN E. MOTT,